(12) United States Patent
Brady

(10) Patent No.: US 7,573,579 B2
(45) Date of Patent: Aug. 11, 2009

(54) CODED APERTURE IMAGING PHOTOPOLARIMETRY

(75) Inventor: David J. Brady, Durham, NC (US)

(73) Assignee: Duke University, Durham, NC (US)

(*) Notice: Subject to any disclaimer, the term of this patent is extended or adjusted under 35 U.S.C. 154(b) by 179 days.

(21) Appl. No.: 11/870,734

(22) Filed: Oct. 11, 2007

(65) Prior Publication Data

US 2008/0088841 A1    Apr. 17, 2008

Related U.S. Application Data

(60) Provisional application No. 60/851,063, filed on Oct. 12, 2006.

(51) Int. Cl.
*G01B 11/02* (2006.01)
*G01B 9/02* (2006.01)
*G01J 3/45* (2006.01)

(52) U.S. Cl. ........................... 356/491; 356/454
(58) Field of Classification Search ............... 356/453, 356/456, 491, 495
See application file for complete search history.

(56) References Cited

U.S. PATENT DOCUMENTS

| 3,904,295 | A   | * | 9/1975  | Hock et al. ............... 356/398 |
| 5,272,496 | A   | * | 12/1993 | Nicolas et al. ............ 353/34  |
| 5,299,036 | A   | * | 3/1994  | Nicolas et al. ............ 349/9   |
| 6,427,033 | B1  | * | 7/2002  | Hait .......................... 385/11 |
| 6,674,522 | B2  | * | 1/2004  | Krantz et al. ............. 356/237.1 |
| 6,674,532 | B2  | * | 1/2004  | VanDelden ............... 356/491 |
| 6,905,211 | B2  | * | 6/2005  | Fujita et al. .............. 352/20  |
| 7,534,984 | B2  | * | 5/2009  | Gleckler ................... 250/208.1 |
| 2003/0103214 | A1 | * | 6/2003 | VanDelden ............... 356/491 |
| 2005/0174573 | A1 | * | 8/2005 | Harvey et al. ............ 356/328 |
| 2006/0171021 | A1 | * | 8/2006 | Scott et al. ............... 359/362 |
| 2007/0126991 | A1 | * | 6/2007 | Fujita et al. .............. 353/81  |
| 2007/0146632 | A1 | * | 6/2007 | Chipman ................... 351/205 |

* cited by examiner

*Primary Examiner*—Patrick J Connolly
(74) *Attorney, Agent, or Firm*—Kasha Law LLC; John R. Kasha

(57) ABSTRACT

An imaging polarimeter includes a polarization dispersing element, a spatial light modulator, a complementary polarization dispersing element, a polarization analyzer, an electronic detection plane, and a processor. The polarization dispersing element polarimetrically disperses an image of an object. The spatial light modulator spatially modulates the polarimetrically dispersed image. The complementary polarization dispersing element polarimetrically combines the spatially modulated and polarimetrically dispersed image. The polarization analyzer mixes orthogonal input polarizations with the polarization states of the polarimetrically combined spatially modulated image. The electronic detection plane measures the polarimetrically combined spatially modulated image that includes mixed polarization states. The processor calculates a polarization of the image from the measured polarimetrically combined spatially modulated image that includes mixed polarization states, an effect of the polarization dispersing element an effect of the spatial light modulator, an effect of the complementary polarization dispersing element, and an effect of the polarization analyzer.

20 Claims, 5 Drawing Sheets

CODED APERTURE IMAGING PHOTOPOLARIMETRY

CROSS-REFERENCE TO RELATED APPLICATION

This application claims the benefit of U.S. Provisional Patent Application No. 60/851,063 filed Oct. 12, 2006, which is herein incorporated by reference in its entirety.

BACKGROUND OF THE INVENTION

1. Field of the Invention

Embodiments of the present invention relate to systems and methods for measuring the polarization state of a light field as a function of spatial position. More particularly, embodiments of the present invention relate to systems and methods for measuring the polarization state of a light field by dispersing a polarization data cube across a coding mask of a spectrometer.

2. Background Information

An imaging photopolarimeter measures the polarization state of a light field as a function of spatial position. The polarization state is most often described in terms of the Stokes parameters, but may be described on an equivalent basis, such as a coherence vector.

Imaging polarimeters have previously been constructed for diverse spectral ranges and applications. In the oldest and most conventional approach to imaging polarimetry the entire input aperture of an imaging system is covered with a temporally varying polarization element or combination of elements. This approach is called temporally variable polarization filtering. Under this approach, one might, for example, record a clear image, images through a linear polarization analyzer at various orientations, and an image through a circularly sensitive analyzer system. The relatively slow image capture time associated with temporal scanning is the primary drawback of this approach, although the cost of adaptive full aperture polarization elements is also a factor. A recent version of this approach combines polarization sensitive holographic devices with temporally modulated polarization elements.

One alternative to varying the polarization properties of a single aperture is using an array of polarization sensitive imagers. This alternative is called spatially parallel polarization imaging. According to this alternative, for example, each aperture is tuned to measure a projection on the polarization state. The full Stokes vector image is then reconstructed jointly from the array of images. This approach overcomes the challenges of the temporally modulated system. A full polarization image may be captured in a single camera frame. The disadvantage of this approach is that it is difficult to spatially register images captured from different cameras. This disadvantage can partially be overcome by using an integrated prism set to separate polarization channels, much in the same way as prism arrays are used in multiple focal plane color cameras. However, the requisite prism assembly is difficult and expensive to manufacture into polarization components, and the overall system cost for multiple camera systems is high.

Various groups have manufactured arrays of micropolarizer components, or micropolarizer arrays. These systems are similar in philosophy to color cameras with red green blue (RGB) filter arrays integrated on the focal plane. Each focal plane pixel detects a specific polarization component, and the well-registered image is synthesized by interpolation between pixel values. Micropolarizer arrays have been particularly successful in infrared imaging systems, where wiregrid fabrication technologies may be applied. Various studies have also demonstrated micropolarizer arrays and nanoscale optical components for visible systems, but to date system performance, fabrication cost, and simplicity have not been sufficiently satisfactory to justify system construction.

Imaging polarimetry has been demonstrated by interferometric sampling in polarization imaging systems. Such systems employ interferometric imaging polarimetry, for example. These systems work in visible spectral ranges, but function only for monochromatic laser illumination rather than broad spectral signals.

In view of the foregoing, it can be appreciated that a substantial need exists for systems and methods that can measure the polarization state of a light field as a function of spatial position in a single time step, at a low cost, and for broad spectral signals.

BRIEF SUMMARY OF THE INVENTION

One embodiment of the present invention is an imaging polarimeter. The imaging polarimeter includes a transverse polarization dispersing element, a transverse spatial light modulator, a complementary transverse polarization dispersing element, a polarization analyzer, an electronic detection plane, and a processor. The transverse polarization dispersing element polarimetrically disperses an image of an object. The transverse spatial light modulator spatially modulates the polarimetrically dispersed image. The complementary transverse polarization dispersing element polarimetrically combines the spatially modulated and polarimetrically dispersed image. The polarization analyzer mixes orthogonal input polarizations with the polarization states of the polarimetrically combined spatially modulated image. The electronic detection plane measures the polarimetrically combined spatially modulated image that includes mixed polarization states. The processor calculates the polarization of the image from the measured polarimetrically combined spatially modulated image that includes mixed polarization states, an effect of the transverse polarization dispersing element, an effect of the transverse spatial light modulator, an effect of the complementary transverse polarization dispersing element, and an effect of the polarization analyzer.

Another embodiment of the present invention is an imaging spectral polarimeter. The imaging spectral polarimeter includes a dispersing element, a transverse spatial light modulator, a complementary dispersing element, a polarization analyzer, an electronic detection plane, and a processor. The dispersing element polarimetrically and spectrally disperses an image of an object. The transverse spatial light modulator spatially modulates the polarimetrically and spectrally dispersed image. The complementary dispersing element polarimetrically and spectrally combines the spatially modulated and polarimetrically and spectrally dispersed image. The polarization analyzer mixes orthogonal input polarizations with the polarization states of the polarimetrically and spectrally combined spatially modulated image. The electronic detection plane measures the polarimetrically and spectrally combined spatially modulated image that includes mixed polarization states. The processor calculates the polarization of the image and a spectral image of the object from the measured polarimetrically and spectrally combined spatially modulated image that includes mixed polarization states, an effect of the dispersing element, an effect of the transverse spatial light modulator, an effect of the complementary dispersing element, and an effect of the polarization analyzer.

Another embodiment of the present invention is a method for determining the polarization of light emanating from an object. An image of the object is polarimetrically dispersed according to a dispersing function. The polarimetrically dispersed image is spatially modulated according to a modulating function. The spatially modulated and polarimetrically dispersed image is polarimetrically combined according to a complementary dispersing function. Orthogonal input polarizations are mixed with the polarization states of the polarimetrically combined spatially modulated image according to a mixing function. The polarimetrically combined spatially modulated image that includes polarization states is measured. The polarization of light emanating from the object is calculated from the measured polarimetrically combined spatially modulated image that includes polarization states, the dispersing function, the modulation function, the complementary dispersing function, and the orthogonal input polarizations.

Another embodiment of the present invention is a method for determining a polarization of light from an object and a spectral image of the object. An image of the object is polarimetrically and spectrally dispersed according to a dispersing function. The polarimetrically and spectrally dispersed image is spatially modulated according to a modulating function. The spatially modulated and polarimetrically and spectrally dispersed image is polarimetrically and spectrally combined according to a complementary dispersing function. Orthogonal input polarizations are mixed with the polarization states of the polarimetrically and spectrally combined spatially modulated image according to a mixing function. The polarimetrically and spectrally combined spatially modulated image that includes mixed polarization states is measured. The polarization of light from the object and a spectral image of the object are calculated from the measured polarimetrically and spectrally combined spatially modulated image that includes mixed polarization states, the dispersing function, the modulation function, the complementary dispersing function, and the orthogonal input polarizations.

Figure 1:
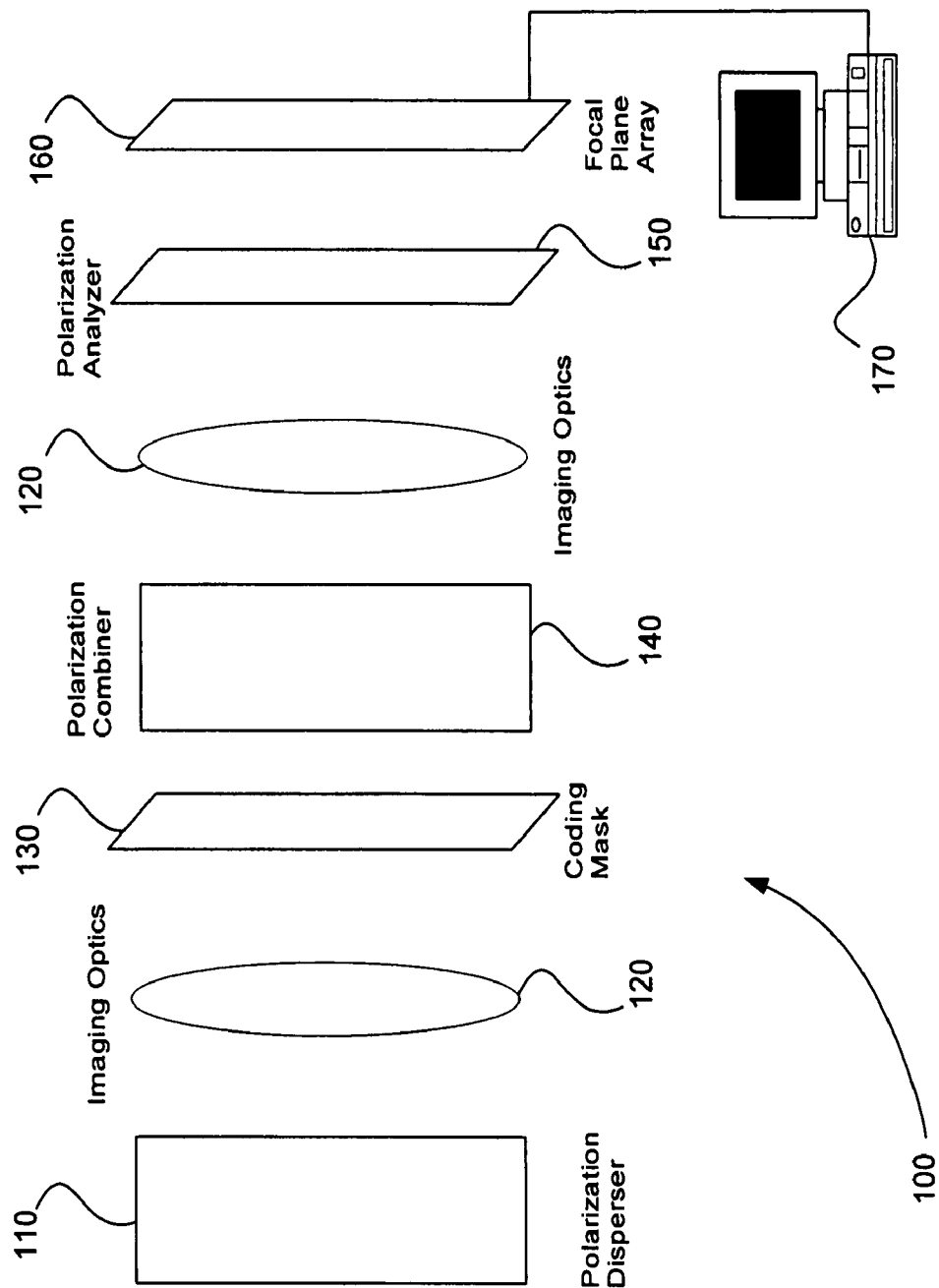
FIG. 1 is a schematic diagram of an imaging polarimeter, in accordance with an embodiment of the present invention.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

One embodiment of the present invention is a single-shot or single time step imaging polarimeter based on imaging plane coding. The basic design of the polarimeter is based on a two-dimensional (2D) coded aperture static multimode multiplex spectrometer (MMS). A static MMS is described in U.S. Pat. No. 7,092,101, which is herein incorporated by reference in its entirety. A 2D coded aperture static MMS is described in U.S. patent application Ser. No. 11/334,546 filed Jan. 19, 2006, which is herein incorporated by reference in its entirety. A hyperspectral imager is described in U.S. patent application Ser. No. 11/580,925 filed Oct. 16, 2006. Systems and method for spatially registered wavelength coding are described in U.S. patent application Ser. No. 11/735,562 filed Apr. 16, 2007. In these previous embodiments, the spectral data cube is dispersed across a coding mask. In embodiments of the present invention, the polarization data cube is dispersed across a coding mask. It is also possible to combine spectral and polarization dispersion to create an imaging polarimetric spectrometer.

FIG. 1 is a schematic diagram of an imaging polarimeter 100, in accordance with an embodiment of the present invention. Imaging polarimeter 100 includes polarization disperser 110, imaging optics 120, spatial light modulator 130, polarization combiner 140, polarization analyzer 150, focal plane array 160, and a processor 170. Polarization disperser 110 is used to form polarization sensitive image arrays through a conventional imaging system.

Polarization disperser 110 is a transverse polarization dispersing element, for example. Polarization disperser 110 can be, but is not limited to, a birefringent element or one or more Babinet compensators. Imaging optics 120 can include at least two separate optical elements. The first optical element is used to condition light from polarization disperser 110 onto spatial light modulator 130. The second optical element is used to condition light from polarization combiner 140 onto polarization analyzer 150. Spatial light modulator 130 is a transverse spatial light modulator, for example. Spatial light modulator 130 can be, but is not limited to a two-dimensional coded transmission mask, a micromechanical device, or a liquid crystal device. A coded transmission mask can be encoded with independent columns codes or orthogonal column codes, for example. Polarization combiner 140 is a complementary transverse polarization dispersing element, for example. Polarization combiner 140 can be, but is not limited to, a birefringent element or one or more Babinet compensators. Polarization analyzer 150 is a linear polarizer, for example. Focal plane array 160 is an electronic detection plane or a two-dimensional electronic detector array, for example. Processor 170 can be, but is not limited to a microprocessor, a microcontroller, or a computer.

Polarization disperser 110 relies on the well-known property of image replication when imaging through anisotropic optical crystals. Multiple image formation is described using, for example, amplitude response matrix (ARM), h. h is a 2 by 2 matrix describing the transformation between the input coherent polarization at an object point and the output polarization at an image point. The coherent image transformation is $$g(x,y)=h(x,y)*f(x,y) \quad (1)$$

where f is the input field and g is the output field. Polarimetry is ultimately interested in partially coherent and incoherent imaging systems, but the ARM is a useful tool in determining the appropriate point spread function.

Polarization elements such as a dual Babinet compensator psuedodepolarizer (DBCP) and a cornu psuedodepolarizer produce multiple copies of the image projected on different polarization components. The DCBP, for example, produces four copies of the image based on the ARM.

$$h(x, y) = \frac{1}{4} \begin{pmatrix} h(x+k_+, y+l) + & h(x-k_-, y+l) - \\ h(x+k_-, y-l) & h(x-k_-, y-l) \\ h(x+k_+, y+l) - & h(x-k_-, y+l) + \\ h(x+k_-, y-l) & h(x-k_-, y-l) \end{pmatrix} \quad (2)$$

where $$k_{\pm} = \frac{\delta \lambda F}{4\pi}\left(1 \pm \frac{1}{\sqrt{2}}\right) \quad (3)$$

and $$l = \frac{\delta \lambda F}{4\sqrt{2}\,\pi} \quad (4)$$

$\delta$ is the rate of retardation variation across the Babinet compensator. $h(x,y)$ is a coherent impulse response of imaging system 100 absent polarization disperser 110.

Figure 2:
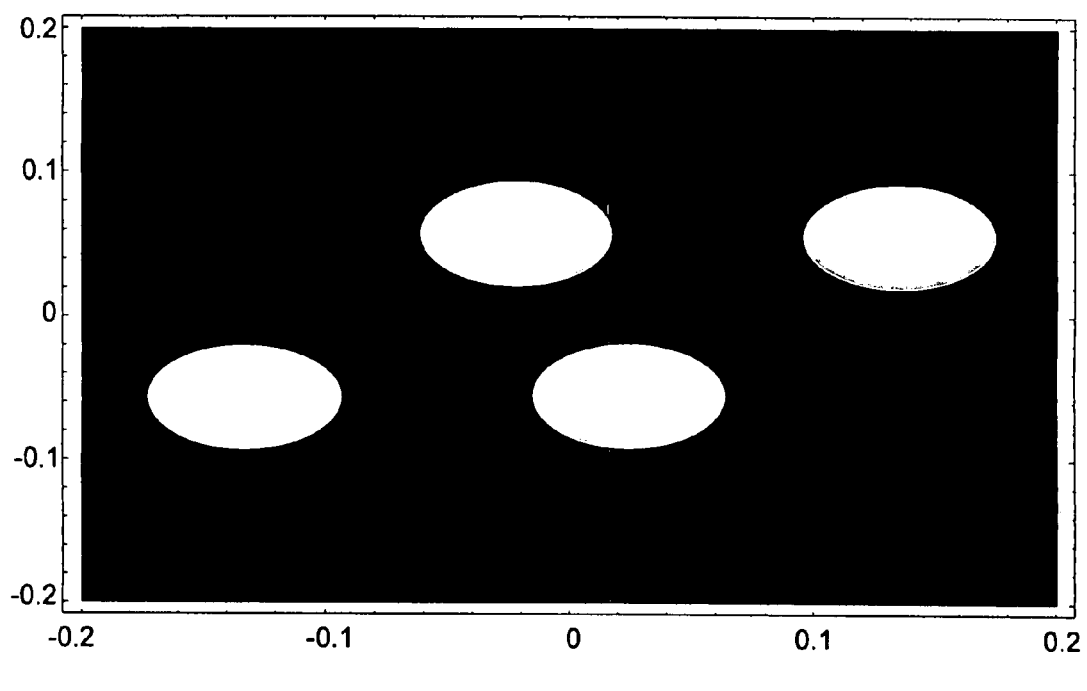
FIG. 2 is an exemplary dot pattern produced from an exemplary dual Babinet compensator psuedodepolarizer, in accordance with an embodiment of the present invention.

FIG. 2 is an exemplary dot pattern 200 produced from an exemplary DBCP, in accordance with an embodiment of the present invention. Each of the illustrated dots has a different polarization. The upper and lower left dots depend only on the horizontal polarization of the image field, the upper and lower right depend only on the vertical polarization of the image field. Varying the axes of the Babinet compensators, for example, adjusts the relative position and polarizations of the dots.

Returning to FIG. 1, polarization disperser 110 polarimetrically disperses an image of an object. Polarization disperser 110 receives an image and forms an array of two or more copies of the image, where each copy has a different polarization. The dot pattern from an input image pixel of the array is spatially modulated by spatial light modulator 130 in the image plane following polarization disperser 110. As mentioned above, spatial light modulator 130 can be a coding mask. The most easily fabricated coding mask is a binary pattern of transmissive and opaque holes, for example.

Following spatial light modulator 130, polarization combiner 140 combines the spatially modulated and polarimetrically dispersed image. In other words, polarization combiner 140 combines two or more copies of the image after they have been modulated. Polarization combiner 140, therefore, returns the polarization hypercube to its original undisturbed state. Absent spatial light modulator 130, polarimeter 100 would not modulate the image at all. As described above, polarization combiner 140 is a complementary DBCP, for example.

If spatial light modulator 130 is a periodic coding mask, however, a different polarization projection is produced in each output pixel. Polarization analyzer 150, prior to focal plane array 160, mixes orthogonal input polarizations to obtain Stokes parameters from the mixed polarization states. The net result is a Bayer pattern-like polarization imaging system.

Focal plane array 160 measures the polarimetrically combined spatially modulated image that includes mixed polarization states. Processor 170 calculates the polarization of the image from the measured polarimetrically combined spatially modulated image that includes mixed polarization states, an effect of polarization disperser 110; an effect of spatial light modulator 130, an effect of polarization combiner 140, and an effect of polarization analyzer 140. Processor 170 calculates the polarization of the image in a single time step.

Figure 3:
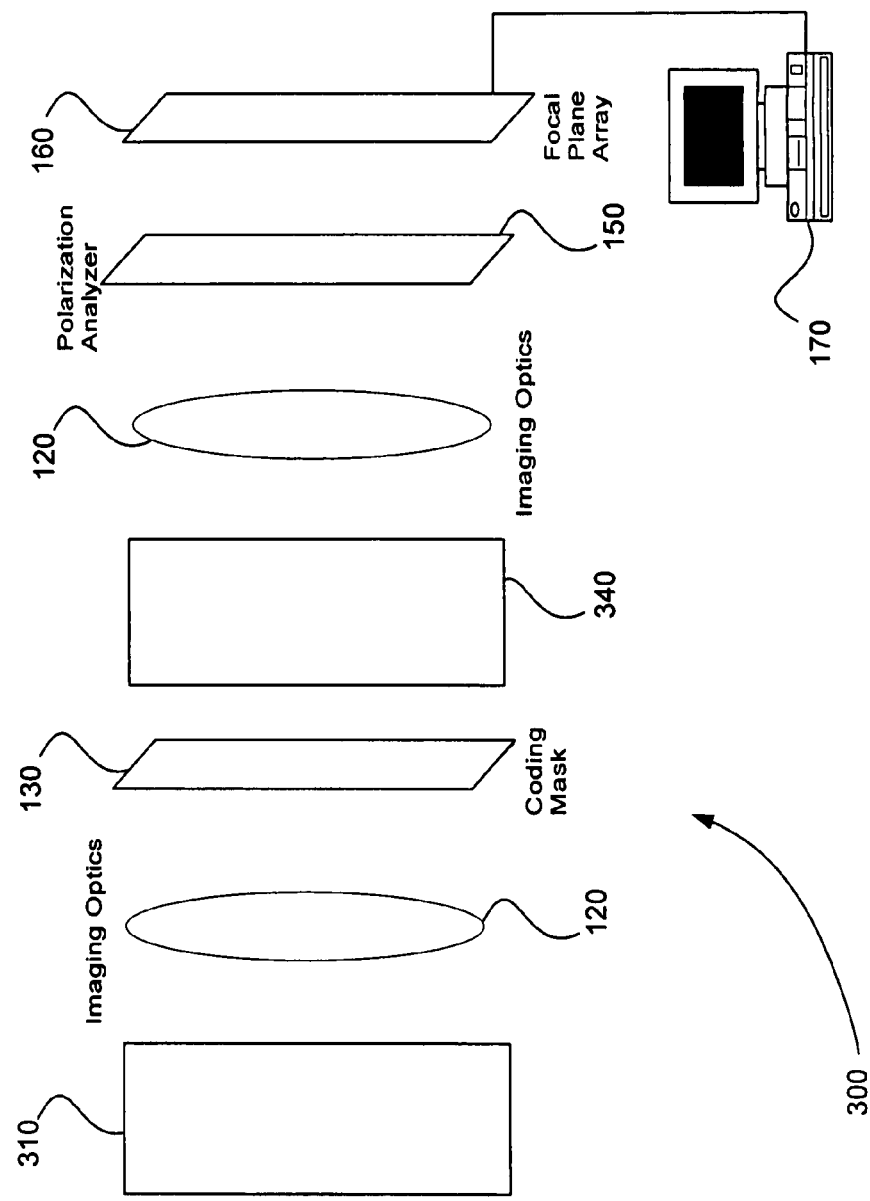
FIG. 3 is a schematic diagram of an imaging spectral polarimeter, in accordance with an embodiment of the present invention.

FIG. 3 is a schematic diagram of an imaging spectral polarimeter 300, in accordance with an embodiment of the present invention. Imaging spectral polarimeter 300 includes dispersing element 310, spatial light modulator 130, complementary dispersing element 340, polarization analyzer 150, focal plane array 160, and processor 170. Polarization dispersion is combined with spectral dispersion to produce imaging spectral polarimeter 300. Imaging spectral polarimeter 300 produces a Bayer-like spatio-spectral-polarization code over the detected image.

Dispersing element 310 can be, but is not limited to, a spectral dispersion element in series with a polarization dispersion element or a polarization dispersion element that also implements spectral dispersion. A spectral dispersion element can be, but is not limited to, a diffraction grating, a prism, or a combination of a diffraction grating and a prism. A polarization dispersion element can be, but is not limited to, a birefringent element or one or more Babinet compensators. A dispersion element that also implements spectral dispersion is a birefringent prism, for example.

Imaging optics 120 can include at least two separate optical elements. The first optical element is used to condition light from polarization disperser 110 onto spatial light modulator 130. The second optical element is used to condition light from polarization combiner 140 onto polarization analyzer 150. Spatial light modulator 130 is a transverse spatial light modulator, for example. Spatial light modulator 130 can be, but is not limited to a two-dimensional coded transmission mask, a micromechanical device, or a liquid crystal device. A coded transmission mask can be encoded with independent columns codes or orthogonal column codes, for example.

Complementary dispersing element 340 can be, but is not limited to, a spectral dispersion element in series with a polarization dispersion element or a polarization dispersion element that also implements spectral dispersion. Complementary dispersing element 340 performs a polarization dispersion that is substantially equal to but opposite that of dispersing element 310. Complementary dispersing element 340 also performs a spectral dispersion that is substantially equal to but opposite that of dispersing element 310.

Polarization analyzer 150 is a linear polarizer, for example. Focal plane array 160 is an electronic detection plane or a two-dimensional electronic detector array, for example. Processor 170 can be, but is not limited to a microprocessor, a microcontroller, or a computer.

Dispersing element 310 polarimetrically and spectrally disperses an image of an object. Spatial light modulator 130 spatially modulates the polarimetrically and spectrally dispersed image. Complementary dispersing element 340 polarimetrically and spectrally combines the spatially modulated and polarimetrically and spectrally dispersed image. Polarization analyzer 150 mixes orthogonal input polarizations with the polarization states of the polarimetrically and spectrally combined spatially modulated image. Focal plane array 160 measures the polarimetrically and spectrally combined spatially modulated image that includes mixed polarization states. Processor 170 calculates the polarization of the image and a spectral image of the object from the measured polarimetrically and spectrally combined spatially modulated image that includes mixed polarization states, an effect of dispersing element 310; an effect of spatial light modulator 130, an effect of complementary dispersing element 340, and an effect of polarization analyzer 150. Processor 170 calculates the polarization of the image and a spectral image of the object in a single time step.

Figure 4:
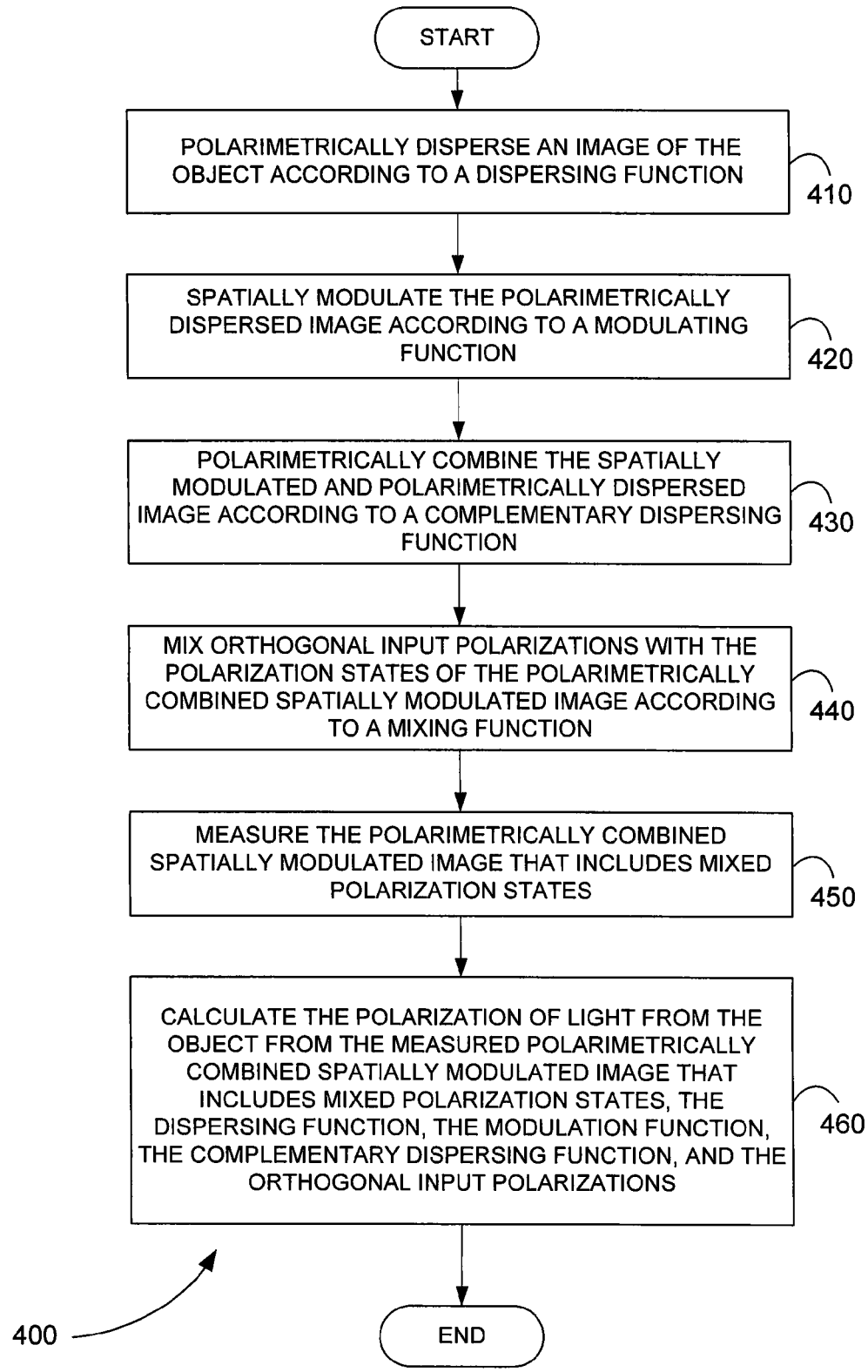
FIG. 4 is a flowchart showing a method for determining the polarization of light from an object, in accordance with an embodiment of the present invention.

FIG. 4 is a flowchart showing a method 400 for determining the polarization of light from an object, in accordance with an embodiment of the present invention.

In step 410, of method 400, an image of the object is polarimetrically dispersed according to a dispersing function.

In step 420, the polarimetrically dispersed image is spatially modulated according to a modulating function.

In step 430, the spatially modulated and polarimetrically dispersed image is polarimetrically combined according to a complementary dispersing function.

In step 440, orthogonal input polarizations are mixed with the polarization states of the polarimetrically combined spatially modulated image according to a mixing function.

In step 450, the polarimetrically combined spatially modulated image that includes polarization states is measured.

In step 460, the polarization of light emanating from the object is calculated from the measured polarimetrically combined spatially modulated image that includes polarization states, the dispersing function, the modulation function, the complementary dispersing function, and the orthogonal input polarizations.

Figure 5:
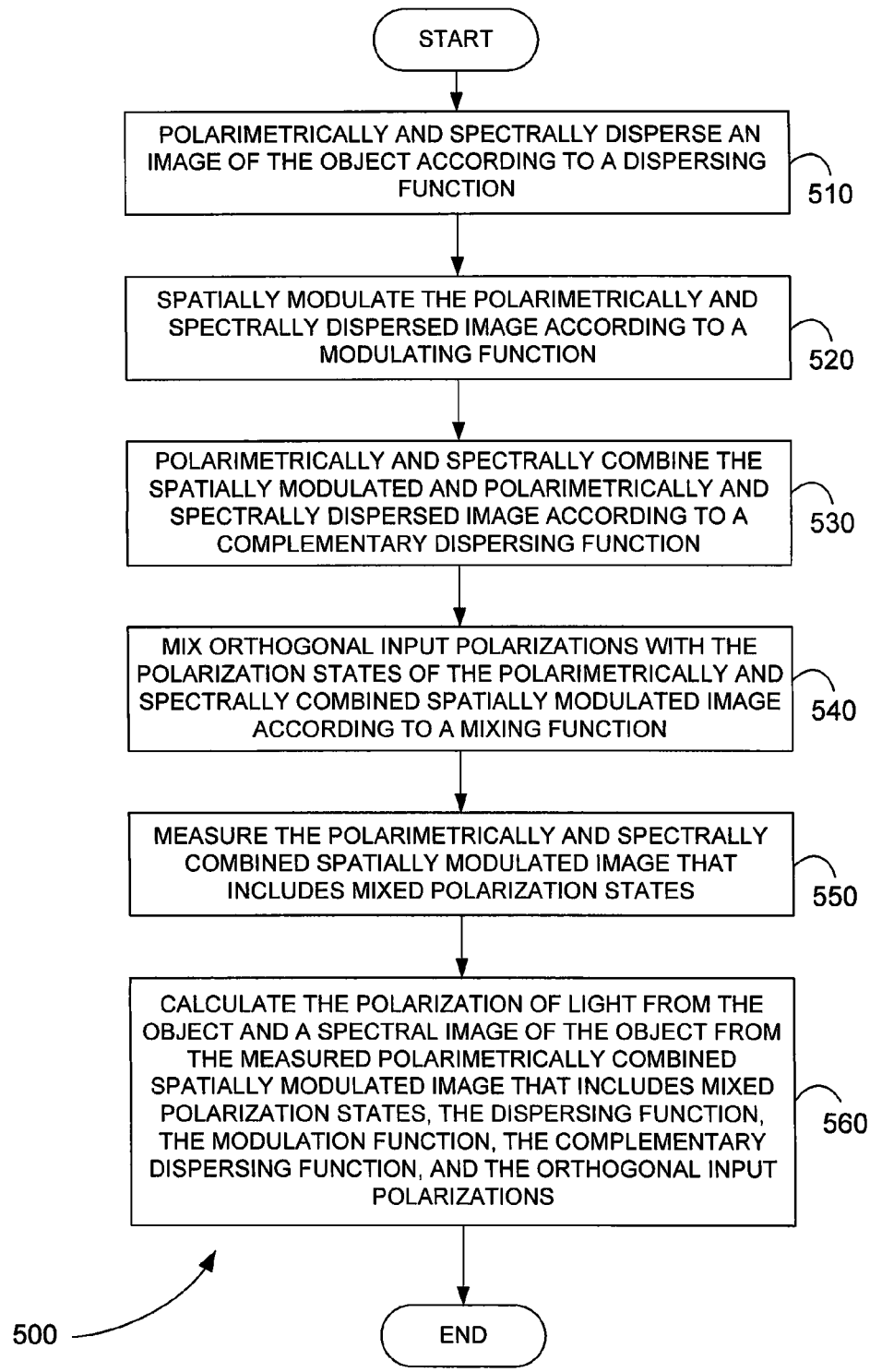
FIG. 5 is a flowchart showing method for determining the polarization of light from an object and a spectral image of the object, in accordance with an embodiment of the present invention.

FIG. 5 is a flowchart showing method 500 for determining the polarization of light from an object and a spectral image of the object, in accordance with an embodiment of the present invention.

In step 510 of method 500, an image of the object is polarimetrically and spectrally dispersed according to a dispersing function.

In step 520, the polarimetrically and spectrally dispersed image is spatially modulated according to a modulating function.

In step 530, the spatially modulated and polarimetrically and spectrally dispersed image is polarimetrically and spectrally combined according to a complementary dispersing function.

In step 540, orthogonal input polarizations are mixed with the polarization states of the polarimetrically and spectrally combined spatially modulated image according to a mixing function.

In step 550, the polarimetrically and spectrally combined spatially modulated image that includes mixed polarization states is measured.

In step 560, the polarization of light from the object and a spectral image of the object are calculated from the measured polarimetrically and spectrally combined spatially modulated image that includes mixed polarization states, the dispersing function, the modulation function, the complementary dispersing function, and the orthogonal input polarizations.

In accordance with an embodiment of the present invention, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An imaging polarimeter, comprising:
 a transverse polarization dispersing element that polarimetrically disperses an image of an object;
 a transverse spatial light modulator that spatially modulates the polarimetrically dispersed image;
 a complementary transverse polarization dispersing element that polarimetrically combines the spatially modulated and polarimetrically dispersed image;
 a polarization analyzer that mixes orthogonal input polarizations with the polarization states of the polarimetrically combined spatially modulated image;
 an electronic detection plane that measures the polarimetrically combined spatially modulated image with mixed polarization states; and
 a processor that calculates a polarization of the image from the measured polarimetrically combined spatially modulated image with mixed polarization states, an effect of the transverse polarization dispersing element; an effect of the transverse spatial light modulator, an effect of the complementary transverse polarization dispersing element, and an effect of the polarization analyzer.

2. The imaging polarimeter of claim 1, wherein the transverse polarization dispersing element comprises a birefringent element.

3. The imaging polarimeter of claim 1, wherein complementary transverse polarization dispersing element comprises a birefringent element.

4. The imaging polarimeter of claim 1, wherein the transverse polarization dispersing element comprises one or more Babinet compensators.

5. The imaging polarimeter of claim 1, wherein complementary transverse polarization dispersing element comprises one or more Babinet compensators.

6. The imaging polarimeter of claim 1, wherein the transverse spatial light modulator comprises a coded transmission mask.

7. The imaging polarimeter of claim 6, wherein the coded transmission mask comprises a two-dimensional orthogonal column code mask.

8. The imaging polarimeter of claim 1, wherein the transverse spatial light modulator comprises a micromechanical device.

9. The imaging polarimeter of claim 1, wherein the transverse spatial light modulator comprises a liquid crystal device.

10. The imaging polarimeter of claim 1, wherein the transverse spatial light modulator comprises a liquid crystal device.

11. The imaging polarimeter of claim 1, further comprising a first optical element that conditions the polarimetrically dispersed image from the transverse polarization dispersing element onto the transverse spatial light modulator and a second optical element that conditions the polarimetrically combined spatially modulated image from the complementary transverse polarization dispersing element onto the polarization analyzer.

12. An imaging spectral polarimeter, comprising:
  a dispersing element that polarimetrically and spectrally disperses an image of an object;
  a transverse spatial light modulator that spatially modulates the polarimetrically and spectrally dispersed image;
  a complementary dispersing element that polarimetrically and spectrally combines the spatially modulated and polarimetrically and spectrally dispersed image;
  a polarization analyzer that mixes orthogonal input polarizations with the polarization states of the polarimetrically and spectrally combined spatially modulated image;
  an electronic detection plane that measures the polarimetrically and spectrally combined spatially modulated image with mixed polarization states; and
  a processor that calculates a polarization of the image and a spectral image of the object from the measured polarimetrically and spectrally combined spatially modulated image with mixed polarization states, an effect of the dispersing element; an effect of the transverse spatial light modulator, an effect of the complementary dispersing element, and an effect of the polarization analyzer.

13. The imaging spectral polarimeter of claim 12, wherein the dispersing element comprises a spectral dispersion element in series with a polarization dispersion element.

14. The imaging spectral polarimeter of claim 12, wherein the complementary dispersing element comprises a spectral dispersion element in series with a polarization dispersion element.

15. The imaging spectral polarimeter of claim 12, wherein the dispersing element comprises a polarization dispersion element that also implements spectral dispersion.

16. The imaging spectral polarimeter of claim 15, wherein the polarization dispersion element comprises a birefringent prism.

17. The imaging spectral polarimeter of claim 12, wherein the complementary dispersing element comprises a polarization dispersion element that also implements spectral dispersion.

18. The imaging spectral polarimeter of claim 17, wherein the polarization dispersion element comprises a birefringent prism.

19. A method for determining a polarization of light from an object, comprising:
  polarimetrically dispersing an image of the object according to a dispersing function;
  spatially modulating the polarimetrically dispersed image according to a modulating function;
  polarimetrically combining the spatially modulated and polarimetrically dispersed image according to a complementary dispersing function;
  mixing orthogonal input polarizations with the polarization states of the polarimetrically combined spatially modulated image according to a mixing function;
  measuring the polarimetrically combined spatially modulated image with mixed polarization states; and
  calculating the polarization from the measured polarimetrically combined spatially modulated image with mixed polarization states, the dispersing function, the modulation function, the complementary dispersing function, and the orthogonal input polarizations.

20. A method for determining a polarization of light from an object and a spectral image of the object, comprising:
  polarimetrically and spectrally dispersing an image of the object according to a dispersing function;
  spatially modulating the polarimetrically and spectrally dispersed image according to a modulating function;
  polarimetrically and spectrally combining the spatially modulated and polarimetrically and spectrally dispersed image according to a complementary dispersing function;
  mixing orthogonal input polarizations with the polarization states of the polarimetrically and spectrally combined spatially modulated image according to a mixing function;
  measuring the polarimetrically and spectrally combined spatially modulated image with mixed polarization states; and
  calculating the polarization and the spectral image from the measured polarimetrically and spectrally combined spatially modulated image with mixed polarization states, the dispersing function, the modulation function, the complementary dispersing function, and the orthogonal input polarizations.

* * * * *